(12) United States Patent
Elantably et al.

(10) Patent No.: US 8,587,164 B2
(45) Date of Patent: *Nov. 19, 2013

(54) HIGH POWER-DENSITY, HIGH EFFICIENCY, NON-PERMANENT MAGNET ELECTRIC MACHINE

(75) Inventors: Ahmed Mostafa Elantably, Carmel, IN (US); Ayman Mohamed Fawzi EL-Refaie, Niskayuna, NY (US); Robert Dean King, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,080

(22) Filed: Sep. 7, 2012

(65) Prior Publication Data

US 2012/0326652 A1 Dec. 27, 2012

Related U.S. Application Data

(63) Continuation of application No. 12/842,142, filed on Jul. 23, 2010, now Pat. No. 8,310,115.

(51) Int. Cl.
*H02K 37/00* (2006.01)
*H02K 1/00* (2006.01)

(52) U.S. Cl.
USPC ......... 310/49.44; 310/179; 310/180; 310/181

(58) Field of Classification Search
USPC ................. 310/49.44, 179, 180, 181
See application file for complete search history.

(56) References Cited

U.S. PATENT DOCUMENTS

| 4,321,518 A | 3/1982 | Akamatsu |
|---|---|---|
| 4,459,502 A | 7/1984 | El-Antably |
| 4,883,999 A | 11/1989 | Hendershot |
| 5,122,705 A | 6/1992 | Kusase et al. |
| 6,262,508 B1 | 7/2001 | Shibayama et al. |
| 6,597,077 B2 | 7/2003 | Lin et al. |
| RE38,464 E | 3/2004 | Kusase et al. |
| 7,518,279 B2 | 4/2009 | Chakrabarti et al. |
| 7,830,060 B2 | 11/2010 | Miyata et al. |
| 7,915,778 B2 | 3/2011 | Miyata et al. |
| 2003/0057788 A1 | 3/2003 | Natsuhara et al. |
| 2004/0232780 A1 | 11/2004 | Oohashi |
| 2005/0082922 A1 | 4/2005 | Armiroli et al. |
| 2006/0220488 A1 | 10/2006 | Koike et al. |
| 2006/0273681 A1 | 12/2006 | Durham et al. |

(Continued)

FOREIGN PATENT DOCUMENTS

EP 700143 A3 2/1997

OTHER PUBLICATIONS

Li et al., "Switched reluctance motor with DC assisted excitation," (Abstract), Conference Record of the 1996 IEEE Industry Applications Conference, 31st IAS Annual Meeting, IEEE Service Center, US, vol. 2, Oct. 6-10, 1996, pp. 801-807.

*Primary Examiner* — Tran Nguyen
*Assistant Examiner* — Alex W Mok
(74) *Attorney, Agent, or Firm* — Ziolkowski Patent Solutions Group, SC; John K. Testa

(57) ABSTRACT

A system and method of manufacturing an electric machine comprising a rotor and a stator, wherein the stator comprises a fractional-slot concentrated winding having two sets of terminals, wherein a first set of terminals configures the fractional-slot concentrated winding to have a first pole-number (P1), and wherein a second set of terminals configures the fractional-slot concentrated winding to have a second pole number (P2) different from the first pole-number (P1).

18 Claims, 5 Drawing Sheets

(56) References Cited

U.S. PATENT DOCUMENTS

| | | |
|---|---|---|
| 2007/0114871 A1 | 5/2007 | Imai et al. |
| 2007/0216244 A1 | 9/2007 | Edelson |
| 2008/0157622 A1 | 7/2008 | Shah et al. |
| 2008/0296994 A1 | 12/2008 | El-Refaie et al. |
| 2009/0021093 A1 | 1/2009 | McNamara |
| 2009/0072652 A1 | 3/2009 | Koike |
| 2009/0167255 A1 | 7/2009 | Rozman et al. |
| 2009/0243420 A1 | 10/2009 | Hoshino et al. |

HIGH POWER-DENSITY, HIGH EFFICIENCY, NON-PERMANENT MAGNET ELECTRIC MACHINE

CROSS REFERENCE TO RELATED APPLICATIONS

The present application is a continuation of and claims priority to U.S. Ser. No. 12/842,142 filed on Jul. 23, 2010, the disclosure of which is incorporated herein.

BACKGROUND OF THE INVENTION

Embodiments of the invention relate generally to electric machines having high power-density and, more particularly, to non-permanent magnet electric machines having high efficiency and low cost.

The need for high power density and high efficiency electric machines (i.e., electric motors and generators) has long been prevalent for a variety of applications, particularly for hybrid and/or electric vehicle fraction applications. Due to energy supply and environmental reasons, there has been increased motivation to produce hybrid-electric and/or electric vehicles that are both highly efficient and reliable, yet reasonably priced for the average consumer. However, the drive motor technology available for hybrid-electric and electric vehicles has generally been cost-prohibitive, thereby reducing one (or both) of consumer affordability or manufacturer profitability.

Most commercially available hybrid-electric and electric vehicles rely on internal permanent magnet (IPM) electric machines for traction applications, as IPM machines have been found to have high power density and high efficiency over a wide speed range, and are also easily packaged in front-wheel-drive vehicles. However, in order to obtain such high power density, IPM machines must use expensive sintered high energy-product magnets. Furthermore, IPM machines run at high speed (e.g., 14,000 rpm) to obtain optimum power density, and this high speed operation results in a high back electromagnetic field (EMF). Such high back EMF requires the use of high voltage inverter devices, which results in further increases in overall system costs.

IPM machines also involve intricate rotor and stator designs that are sensitive to high speed operation, thereby increasing the complexity and cost of their manufacture. For example, the stator of an IPM machine generally uses either a three-phase distributed winding or a hair-pin rectangular wire for higher slot fill. These windings are expensive to produce using conventional automatic winding machines. While special automatic winding machine stations may be developed to produce such windings, such tooling customization is also quite costly. Distributed winding coils also extend beyond the stator core on which they are wound, which may be disadvantageous for use in tight packaging situations such as those present in electric and/or hybrid-electric vehicles.

Furthermore, the rotor of IPM machines usually has one or more layers of cut-outs to enable insertion of the magnets, thereby leaving thin bridges between the magnets and the outer surface of the rotor. These thin bridges result in a weakened mechanical connection, which may be problematic due to high centrifugal forces when the rotor is operated at high speeds.

IPM machines also necessitate a small air gap between the stator and rotor (e.g., 0.02-0.03 inches) in order to achieve high power density and high efficiency. The need for a small air gap means that both the stator and rotor must be manufactured with tighter tolerances, thereby adding to the complexity and cost of their construction.

Another drawback to the use of IPM machines is the need for sintered magnets to be used in the rotor if high power-density is to be achieved. These sintered magnets cannot be bonded and must be inserted into the rotor channels unmagnetized, after which the magnets are glued and the assembled rotor is balanced. The rotor is then "dropped" into the stator, the IPM machine is assembled, and the magnets are thereafter magnetized individually using a specialized magnetizing fixture. This process of rotor construction is not easily automated, again adding to the overall expense of manufacturing IPM machines.

For at least the reasons set forth above, the high costs of manufacturing and maintaining IPM machines have limited both the commercialization of hybrid-electric and electric vehicles and the adoption of electric drive motor technology in general.

In addressing the need for more cost-efficient and low-maintenance hybrid-electric and electric technologies, much effort has been made to develop new battery and inverter technologies. However, as evidenced above, there remains a great need for improved and cost-effective drive motor technologies before hybrid-electric and electric drive technologies become fully commercially viable.

It would therefore be desirable to provide a non-permanent magnet electric machine having a high power-density, high efficiency, and relatively low cost.

BRIEF DESCRIPTION OF THE INVENTION

The invention is a directed to an electric machine comprising a rotor and a stator, the stator comprising a fractional-slot concentrated winding having two sets of terminals, wherein a first set of terminals configures the fractional-slot concentrated winding to have a first pole-number (P1), and wherein a second set of terminals configures the fractional-slot concentrated winding to have a second pole number (P2) different from the first pole-number (P1).

In accordance with another aspect of the invention, a synchronous reluctance electric machine is shown comprising a stator having a fractional-slot concentrated winding, a first set of terminals coupled to the fractional-slot concentrated winding such that the fractional-slot concentrated winding has a first number of poles (P1), and a second set of terminals coupled to the fractional-slot concentrated winding such that the fractional-slot concentrated winding has a second number of poles (P2), wherein the second number of poles (P2) is less than the first number of poles (P1). The synchronous reluctance electric machine also comprises an alternating current (AC) power source coupled to the first set of terminals, a direct current (DC) power source coupled to the second set of terminals, and a synchronous reluctance laminated rotor.

In accordance with another aspect of the invention, a method of manufacturing an electric machine is shown, the method comprising the steps of forming a stator having a fractional-slot concentrated winding, forming a first set of terminals having a first pole number (P1) coupled to the fraction-slot concentrated winding, and forming a second set of terminals having a second pole number (P2) coupled to the fractional-slot concentrated winding. The method also comprises coupling the first set of terminals to a first energy source, coupling the second set of terminals to a second energy source, forming a synchronous reluctance laminated rotor, and disposing the synchronous reluctance laminated rotor within the stator.

Various other features and advantages will be made apparent from the following detailed description and the drawings

BRIEF DESCRIPTION OF THE DRAWINGS

The drawings illustrate embodiments presently contemplated for carrying out the invention.

In the drawings.

DETAILED DESCRIPTION

A system is shown to provide a high power-density, high efficiency, and relatively low cost electric machine for use in a variety of applications, including electric and hybrid-electric vehicle traction applications.

While many types of electric machines have been utilized for both drive motor and generation applications, the options for high speed and high power-density applications (such as electric and hybrid-electric vehicle traction applications) have typically been limited by cost and/or performance restraints. As previously noted, many electric and hybrid-electric vehicles utilize internal permanent magnet (IPM) electric machines, which are both costly to produce and risk mechanical failure at high speeds. Embodiments of the invention, however, incorporate a synchronous reluctance electric machine equipped with fractional-slot concentrated windings for high power-density operation without the cost or performance restraints previously found in the industry.

Figure 1:
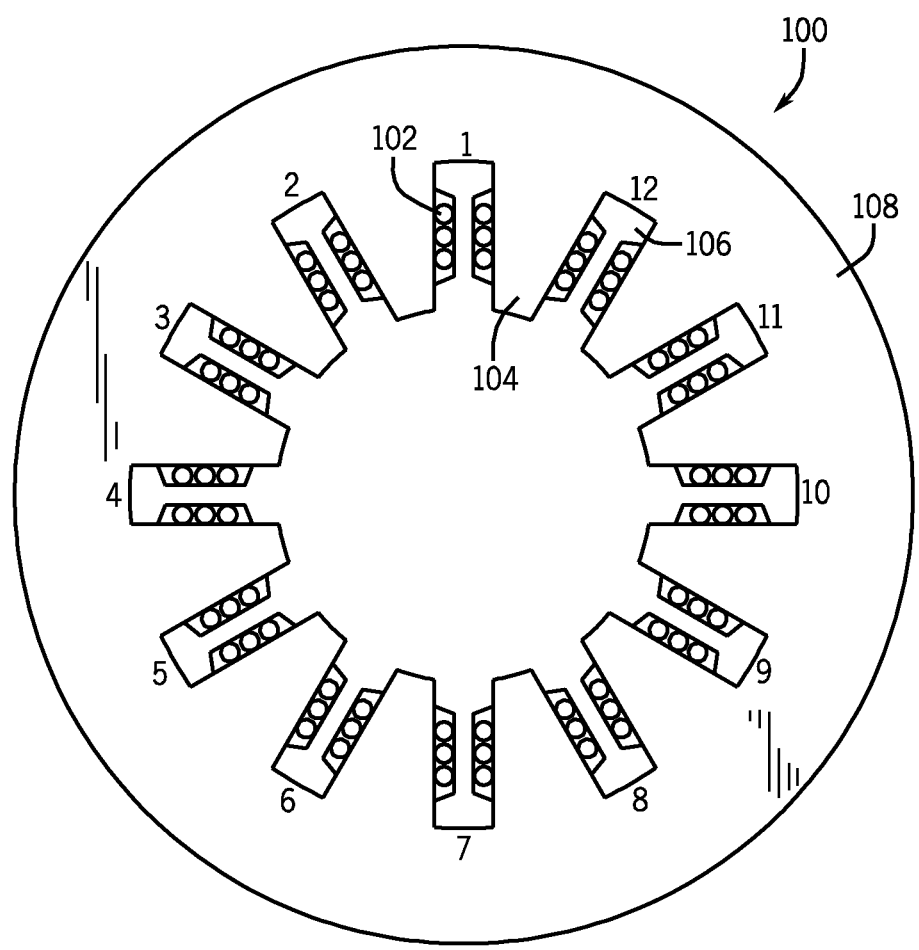
FIG. 1 illustrates a cross-sectional view of a stator in accordance with an embodiment of the invention.

FIG. 1 illustrates a cross-sectional view of a stator 100 of a synchronous reluctance electric machine in accordance with an embodiment of the invention, wherein stator 100 is equipped with a single fractional-slot concentrated winding 102. Stator 100 comprises a plurality of teeth 104, a plurality of slots 106, and a back iron region 108. FIG. 1 shows stator 100 having twelve (12) teeth 104 and twelve (12) slots 106. While it is to be understood that more or fewer teeth 104 and slots 106 may be utilized in the construction of stator 100, both optimum performance over a wide speed range and ease of manufacture must be considered in choosing the number of teeth 104 and slots 106. While fewer teeth 104 and slots 106 may simplify construction of stator 100, performance of the synchronous reluctance electric machine at high speeds may suffer as a result.

Fractional-slot concentrated winding 102 is disposed around each tooth 104 such that there are three (3) coils per tooth 104, as is shown in FIG. 1. Accordingly, a total of thirty-six (36) coils (representing three phases) are present in stator 100. As will be set forth in further detail below, fractional-slot concentrated winding 102 is configured to have two separate pole numbers (P1 and P2) made possible by two separate sets of terminals coupled to fractional-slot concentrated winding 102. In this way, a synchronous reluctance electric machine having a single unique fractional-slot concentrated winding 102 enables AC excitation for one pole number (i.e., P1) and DC excitation for another pole number (i.e., P2).

Figure 2A:
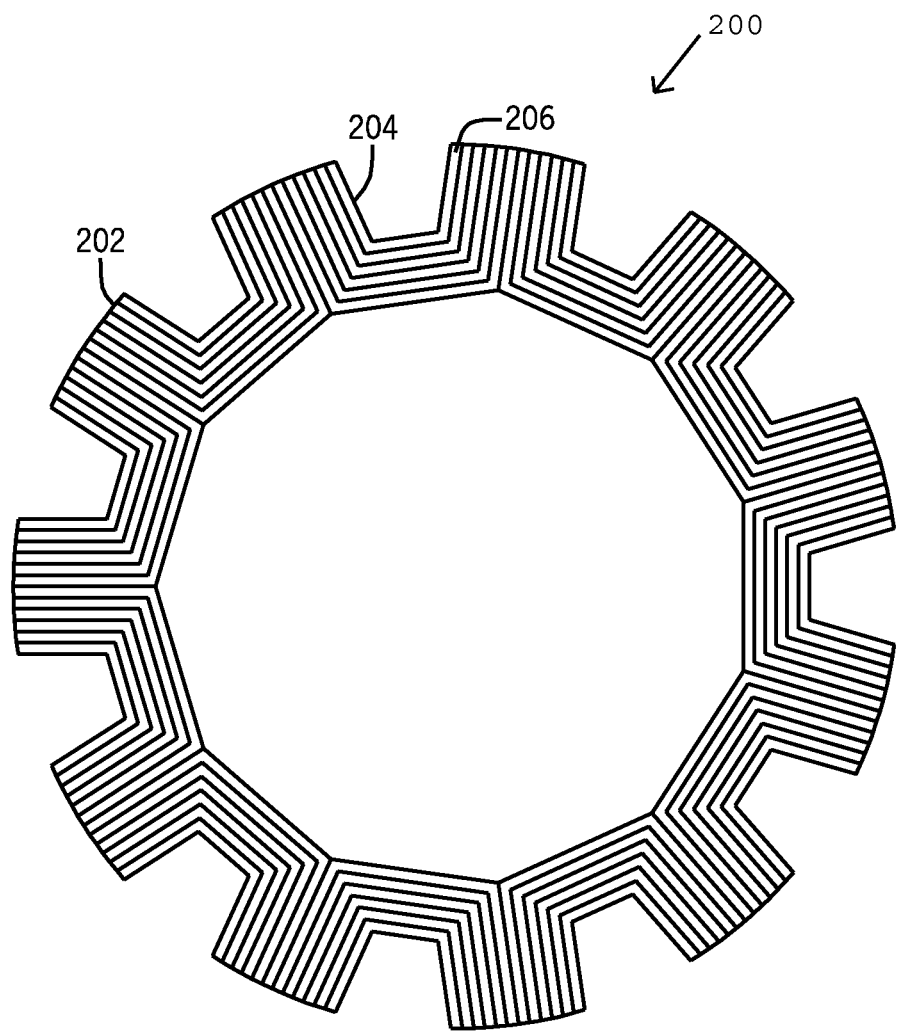
FIG. 2A illustrates a cross-sectional view of a rotor in accordance with an embodiment of the invention.
Figure 2B:
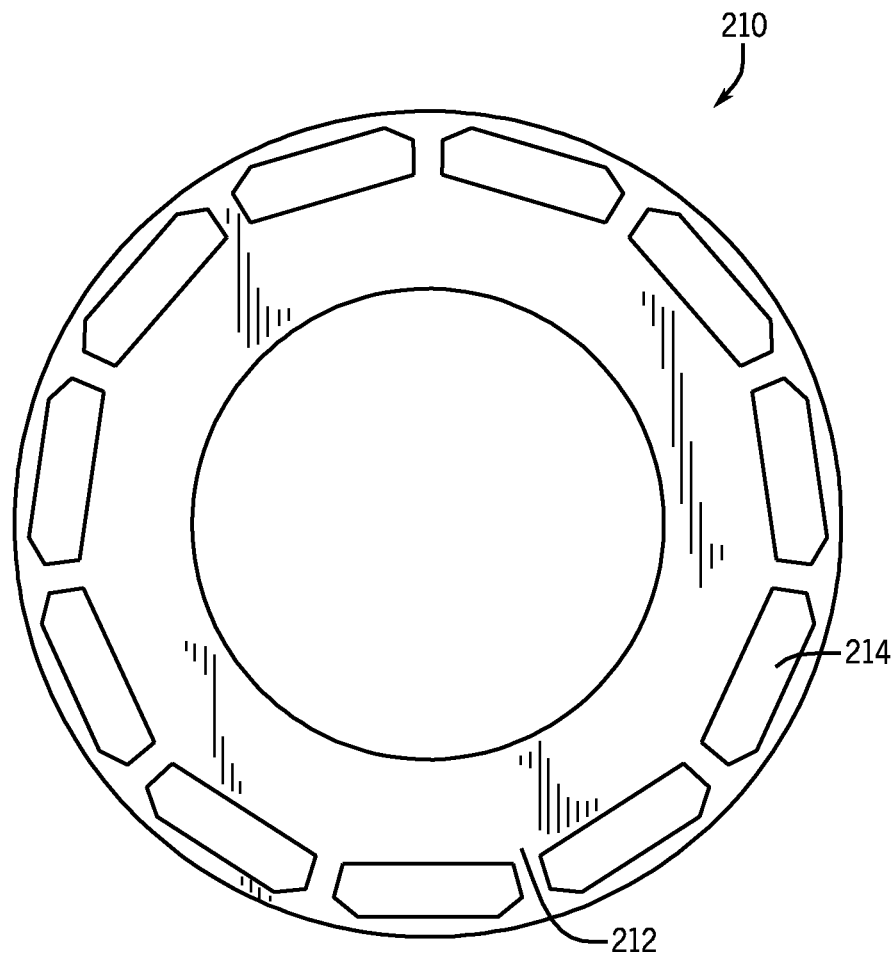
FIG. 2B illustrates a cross-sectional view of a rotor in accordance with another embodiment of the invention.

Referring now to FIGS. 2A and 2B, two separate synchronous reluctance rotor configurations in accordance with embodiments of the invention are shown. The synchronous reluctance rotor may be constructed of steel laminations (for higher power density) or of soft magnetic material (for moderate power density).

First, referring to FIG. 2A, an axially-laminated synchronous reluctance rotor 200 in accordance with an embodiment of the invention is shown. As with all synchronous reluctance electric machines, rotor 200 is sized and configured to be disposed within an axial opening of stator 100 shown in FIG. 1. Rotor 200 is a synchronous reluctance laminated rotor having a plurality of rotor poles 202. Rotor 200 comprises a plurality of axial laminations 204 separated by a plurality of air gaps 206. As is typical in synchronous reluctance electric machines, the number of rotor poles 202 is less than the number of stator poles so as to minimize torque ripple and to prevent simultaneous alignment of the rotor and stator poles. In an embodiment of the invention, the number of rotor poles (P3) of the rotor may be determined by the equation:

$$P3=(P1+P2)/2 \qquad \text{(Eqn. 1)}$$

Thus, if the first pole number (P1) of the stator is twelve (12) and the second pole number (P2) of the stator is ten (10), the number of salient poles (P3) of rotor 200 equates to eleven (11). FIG. 2A illustrates rotor 200 having eleven (11) rotor poles 202 in accordance with an embodiment of the invention. The determination of the number of rotor poles 202 based on Eqn. 1 is ideal for slow-speed applications (e.g., 5000 rpm or less) of the synchronous reluctance electric machine.

On the other hand, for high-speed applications (e.g., 5000 to 15,000 rpm), it has been found that the ideal number of rotor poles (P3) of a rotor may be determined by the equation:

$$P3=(P1-P2)/2 \qquad \text{(Eqn. 2)}$$

In such high-speed applications, the number of poles of the stator (P1 and P2) is generally greater than twelve (12) and ten (10), respectively, and thus the stator has a high number of poles while the rotor has a relatively low number of poles. Such a difference in pole numbers between the stator and the rotor allows for a significant reduction in the stator back iron, which in turn may reduce the overall volume and weight of the electric machine.

As an alternative to axially-laminated rotor 200 shown in FIG. 2A, FIG. 2B illustrates a synchronous reluctance rotor 210 in accordance with another embodiment of the invention. Synchronous reluctance rotor 210 is configured as a conventional synchronous reluctance rotor having a plurality of rotor laminations 212 dispersed axially along the length of rotor 210, with intermittent air gaps 214 in each rotor lamination 212 so as to define a number of rotor poles. As with rotor 200 shown in FIG. 2A, FIG. 2B illustrates rotor 210 having eleven (11) rotor poles in accordance with an embodiment of the invention. The determination of the number of rotor poles may again be based on either Eqn. 1 or Eqn. 2 set forth above, and it is to be understood that fewer or more rotor poles are possible.

As both rotor 200 and rotor 210 are constructed with no windings, magnets, brushes, or slip rings, the cost and complexity of manufacturing such rotors is greatly reduced, particularly in comparison to rotors used in other types of electric machines (e.g., IPM electric machines). Furthermore, as rotors 200 and 210 are preferably laminated rotors, they may be designed to have a relatively large diameter and be operable in high-speed applications. Such a construction enhances the efficiency of the synchronous reluctance electric machine and avoids the structural limitations inherent in rotors used in IPM electric machines.

Figure 3:
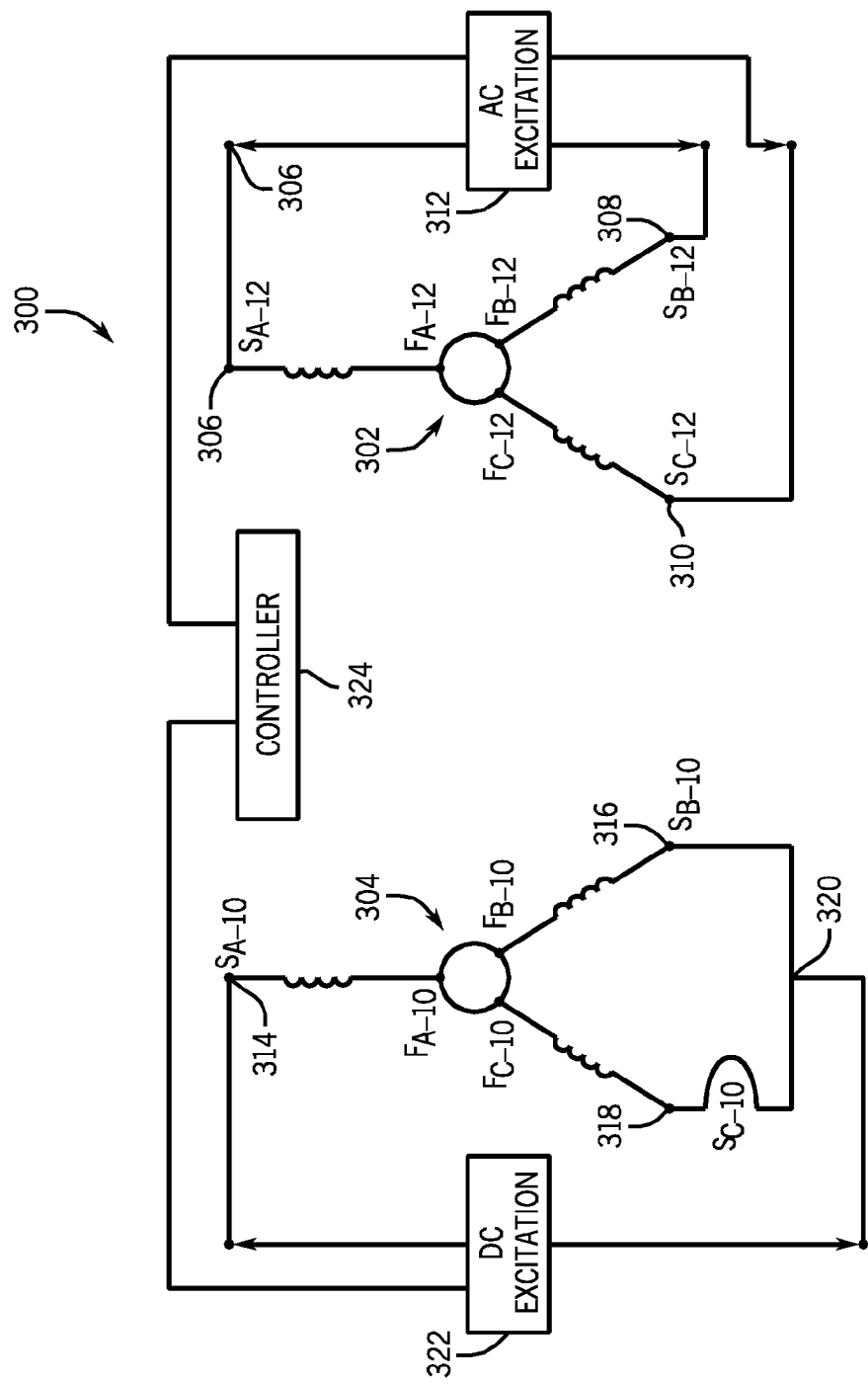
FIG. 3 is a schematic diagram of a stator winding configuration in accordance with an embodiment of the invention.

Referring to FIG. 3, schematic diagram 300 illustrates a stator concentrated winding configuration in accordance with an embodiment of the invention. Schematic diagram 300 shows two balanced wye-connections 302, 304 for a single concentrated winding (i.e., concentrated winding 102 shown in FIG. 1), wherein each wye-connection 302, 304 represents a different pole number. The concentrated winding is wound to form a first pole number (P1) with respect to terminals 306, 308, 310. First pole number (P1) in FIG. 3 is shown to be twelve (12) poles, but it is to be understood that first pole number (P1) could be larger or smaller. An alternating current (AC) power source 312 is coupled to terminals 306, 308, 310 so as to provide three-phase AC excitation for twelve (12) poles of the concentrated winding.

The same concentrated winding also has three additional terminals 314, 316, 318 that are included in a second set of terminals with respect to wye-connection 304. This second set of terminals forms a second pole number (P2) for the fraction-slot concentrated winding of the stator. Second pole number (P2) is shown to be ten (10) poles in FIG. 3, but second pole number (P2) may, like first pole number (P1), be larger and smaller in accordance with embodiments of the invention. While three terminals 314, 316, 318 are shown, terminals 316 and 318 are connected together at point 320. With such a connection, a direct current (DC) power source 322 is coupled to terminal 314 and point 320 to provide DC excitation for ten (10) poles of the concentrated winding.

AC power source 312 and DC power source 322 may be further coupled to a controller 324, wherein controller 324 is configured to control the timing and operation of both AC power source 312 and DC power source 322. For example, only AC power source 312 may be utilized during initial acceleration of the electric machine, while DC power source 322 may be utilized as the electric machine nears synchronous speed. Depending on the torque needed at any given moment, controller 324 is configured to determine whether the two sets of terminals are to be fed with variable AC and DC voltages for synchronous operation or with two different frequencies.

By utilizing the configuration shown in FIG. 3, simultaneous AC excitation for twelve (12) poles and DC excitation for ten (10) poles of the same fractional-slot concentrated winding is possible. Thus, for each phase (e.g., phases A, B, and C), ten (10) poles of the stator will have both an AC component and a DC component, while two (2) poles receive only AC excitation. In this way, a synchronous reluctance electric machine having high power-density, high efficiency, and a simplified construction is possible.

Figure 4:
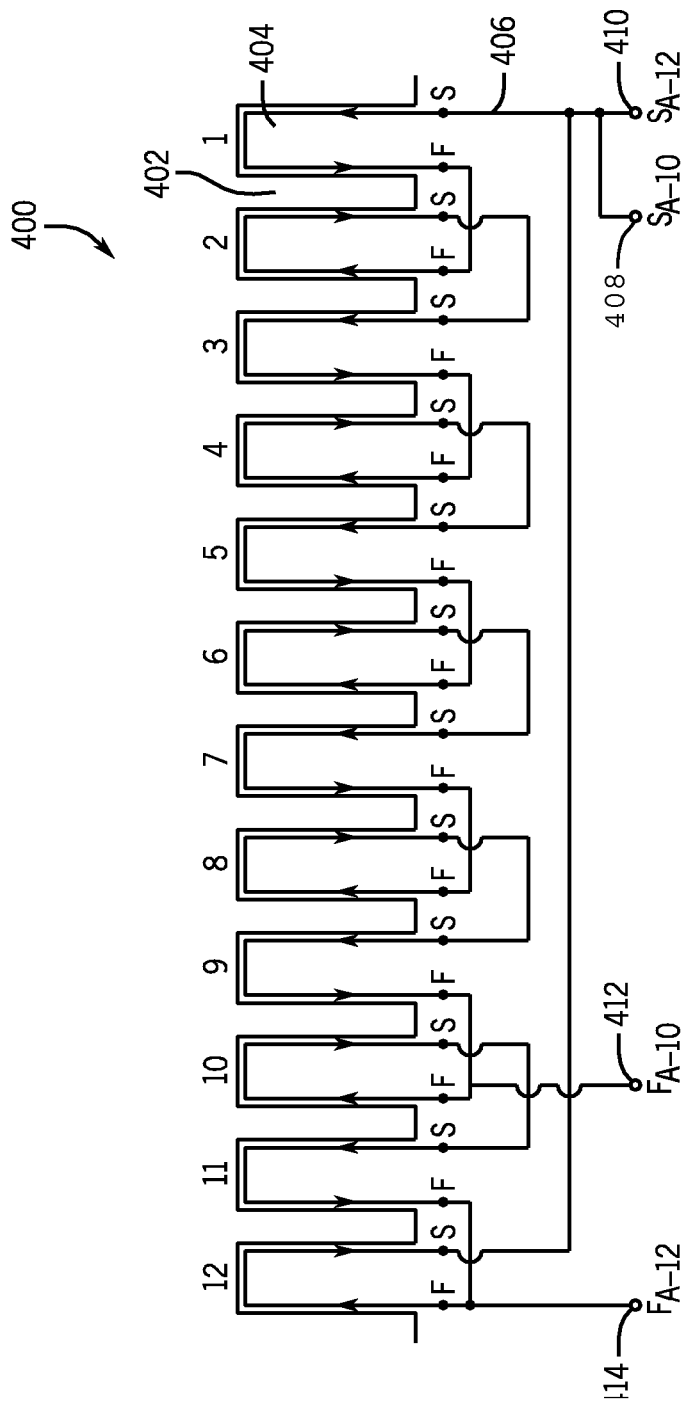
FIG. 4 is a flattened layout of a stator winding configuration in accordance with an embodiment of the invention.

FIG. 4 shows a flattened layout 400 of the stator and fractional-slot concentrated winding as discussed above with respect to both FIG. 1 and FIG. 3. Once again, the stator as shown has twelve (12) teeth 402 and twelve (12) slots 404. A single concentrated winding 406 is also shown, wherein concentrated winding 406 is wound around each tooth 402. For simplicity of illustration, only the phase A winding is shown in FIG. 4, but it is to be understood that the phase B and phase C windings are configured identically with the appropriate phase shift.

Two separate sets of terminals are coupled to concentrated winding 406. Terminal 408 and terminal 410 of the phase A winding (also denoted $S_{A-10}$ and $S_{A-12}$, respectively) share the same starting point on concentrated winding 406. However, a two other terminals (412, 414) have separate finishing points (also denoted $F_{A-10}$ and $F_{A-12}$, respectively). As can readily be seen in FIG. 4, terminal 412 enables concentrated winding 406 to be a ten (10) pole winding, while terminal 414 enables the same concentrated winding 406 to also be a twelve (12) pole winding. As discussed above with respect to FIG. 3, one set of terminals (i.e., terminals 410, 414) may receive AC excitation, while the second set of terminals (i.e., terminals 408, 412) may receive DC excitation. In this way, ten (10) poles of concentrated winding 406 may have an AC component on top of a DC component, while the remaining two (2) poles will have only an AC component. Such a configuration greatly simplifies the construction and cost associated with a synchronous reluctance electric machine.

By utilizing the above embodiments of the invention, a high power-density, high efficiency, and low cost electric machine can be realized without the use of permanent magnets on the stator and/or rotor. As was previously noted, IPM machines run at high speed (e.g., 14,000 rpm) to obtain optimum power density, and this high speed operation results in a high back electromagnetic field (EMF). Such high back EMF requires the use of high voltage inverter devices, which results in further increases in overall system costs. Embodiments of the invention avoid such need for high-voltage inverter devices because the back EMF can be more easily controlled than that of IPM machines. Thus, not only can the manufacturing costs of the stator and rotor be reduced using embodiments of the invention, but the use of costly high voltage inverter devices can also be avoided.

Additionally, the passive rotor of the system (which lacks rotor windings, magnets, or brushes) is simply constructed and insensitive to high speed environments, which is particularly important in electric and hybrid-electric vehicle applications.

Furthermore, the synchronous reluctance operation of the electric machine obviates the need for brushes and/or slip rings, which often pose reliability issues in many electric machines. Also, as previously noted, the fractional-slot concentrated winding configuration not only simplifies the construction of the electric machine but is also capable of reducing the overall volume of the electric machine, thus making the electric machine more suitable for applications that require tight packaging situations (e.g., electric and hybrid-electric traction applications).

Therefore, in accordance with one embodiment of the invention, an electric machine comprises a rotor and a stator, the stator comprising a fractional-slot concentrated winding having two sets of terminals, wherein a first set of terminals configures the fractional-slot concentrated winding to have a first pole-number (P1), and wherein a second set of terminals configures the fractional-slot concentrated winding to have a second pole number (P2) different from the first pole-number (P1).

According to another embodiment of the invention, a synchronous reluctance electric machine is shown comprising a stator having a fractional-slot concentrated winding, a first set of terminals coupled to the fractional-slot concentrated winding such that the fractional-slot concentrated winding has a first number of poles (P1), and a second set of terminals coupled to the fractional-slot concentrated winding such that the fractional-slot concentrated winding has a second number of poles (P2), wherein the second number of poles (P2) is less than the first number of poles (P1). The synchronous reluctance electric machine also comprises an alternating current (AC) power source coupled to the first set of terminals, a direct current (DC) power source coupled to the second set of terminals, and a synchronous reluctance laminated rotor.

According to yet another embodiment of the invention, a method of manufacturing an electric machine is shown, the method comprising the steps of forming a stator having a fractional-slot concentrated winding, forming a first set of terminals having a first pole number (P1) coupled to the fraction-slot concentrated winding, and forming a second set of terminals having a second pole number (P2) coupled to the fractional-slot concentrated winding. The method also comprises coupling the first set of terminals to a first energy source, coupling the second set of terminals to a second energy source, forming a synchronous reluctance laminated rotor, and disposing the synchronous reluctance laminated rotor within the stator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical circuit coupled to a non-permanent magnet electric machine comprising:
    an alternating current (AC) source configured to apply an AC voltage to a first set of poles of a stator; and
    a direct current (DC) source configured to apply a DC voltage to a second set of poles of the stator;
    wherein the second set of poles has fewer poles than the first set of poles; and
    wherein the first set of poles and the second set of poles are formed from a single fractional-slot concentrated winding.

2. The electrical circuit of claim 1 comprising a first wye-connection comprising the first set of poles.

3. The electrical circuit of claim 2 wherein the first wye-connection is a first three-phase circuit that comprises the first set of poles in one phase winding of the first three-phase circuit.

4. The electrical circuit of claim 2 comprising a second wye-connection comprising the second set of poles.

5. The electrical circuit of claim 4 wherein the second wye-connection is a second three-phase circuit that comprises the second set of poles in one phase winding of the second three-phase circuit.

6. The electrical circuit of claim 1 wherein the stator comprises twelve slots.

7. The electrical circuit of claim 1 wherein, when the AC voltage is applied to the first set of poles, a first pole-number (P1) of the stator is excited, and when the DC voltage is applied to the second set of poles, a second pole-number (P2) is excited in addition to the excitation from the first voltage applied to the first set of poles.

8. The electrical circuit of claim 7 wherein a number of rotor poles (P3) driven by the electrical circuit are determined by the equation P3=(P1+P2)/2.

9. The electrical circuit of claim 7 wherein a number of rotor poles (P3) driven by the electrical circuit are determined by the equation P3=(P1−P2)/2.

10. The electrical circuit of claim 1 wherein the first set of poles includes the second set of poles.

11. An electrical circuit for a synchronous reluctance electric machine comprising:
    a pair of balanced wye-connections for a single fractional-slot concentrated winding of a stator, the pair of wye-connections comprising:
        a first wye-connection comprising a first set of terminals of the stator, wherein the first wye-connection includes a first three-phase circuit that comprises the first set of terminals in one phase winding of the first three-phase circuit; and
        a second wye-connection comprising a second set of terminals, wherein the second wye-connection is a second three-phase circuit that comprises the second set of terminals in one phase winding of the second three-phase circuit
    an alternating current (AC) power source coupled to the first set of terminals of the stator; and
    a direct current (DC) power source coupled to the second set of terminals of the stator;
    wherein the single fractional-slot concentrated winding is configured to have a first pole number and a second pole number based on the first set of terminals and the second set of terminals, respectively, with the first wye-connection representing the first pole number and the second wye-connection representing the second pole number.

12. The electrical circuit of claim 11 wherein the first and second sets of terminals are arranged such that the second number of poles (P2) is simultaneously excited by both the AC power source from the first set of terminals and by the DC power source from the second set of terminals.

13. The electrical circuit of claim 11 wherein a number of rotor poles (P3) driven by the electrical circuit are determined by the equation P3=(P1+P2)/2.

14. The electrical circuit of claim 11 wherein a number of rotor poles (P3) driven by the electrical circuit are determined by the equation P3=(P1−P2)/2.

15. The electrical circuit of claim 11 wherein the first set of terminals includes the second set of terminals.

16. A method of fabricating an electrical circuit for a synchronous reluctance electric machine comprising:
    forming a pair of balanced wye-connections for a single fractional-slot concentrated winding of a stator, wherein forming the pair of wye-connections comprises:
        forming a first three-phase circuit having a first wye-connection comprised of a first set of poles of the stator, wherein the first wye-connection includes the first set of poles in one phase winding of the first three-phase circuit; and
        forming a second three-phase circuit having a second wye-connection comprised of a second set of poles of the stator, wherein the second wye-connection includes the second set of poles in one phase winding of the second three-phase circuit
    coupling an alternating current (AC) power source to the first set of poles of the stator; and
    coupling a direct current (DC) power source to the second set of poles of the stator, wherein a number of the second set of poles is less than a number of the first set of poles.

17. The method of claim 16 comprising:
    arranging the first set of poles and the second set of poles such that the second number of poles (P2) is simultaneously excitable by:
        1) the AC power source from the first set of poles; and
        2) the DC power source from the second set of poles.

18. The method of claim 16 wherein the first set of poles includes the second set of poles.

* * * * *